March 17, 1959     W. A. DOWNEY     2,878,035
ADJUSTABLE HITCH FOR TOWING VEHICLES
Filed Sept. 14, 1954     2 Sheets—Sheet 1
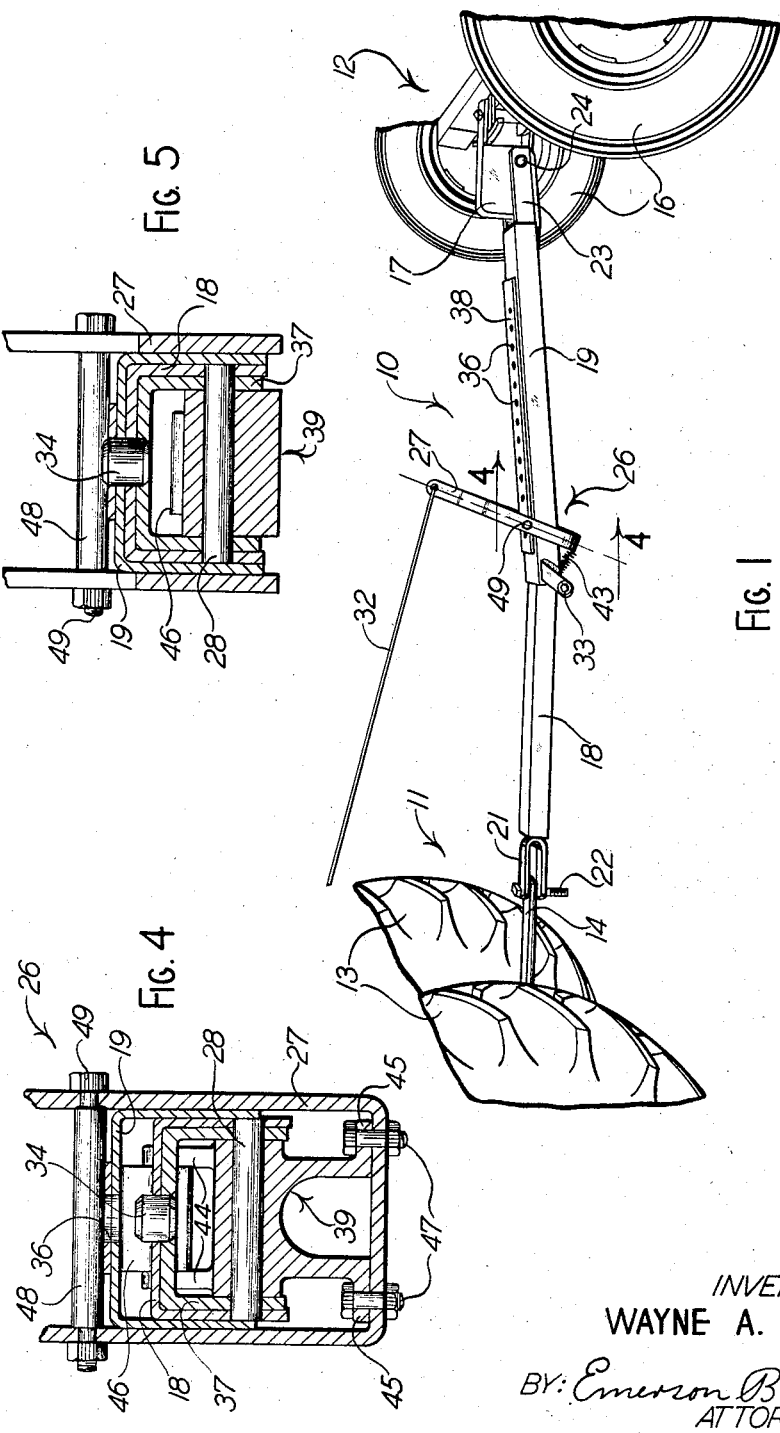
INVENTOR:
WAYNE A. DOWNEY
BY: Emerson B Donnell
ATTORNEY

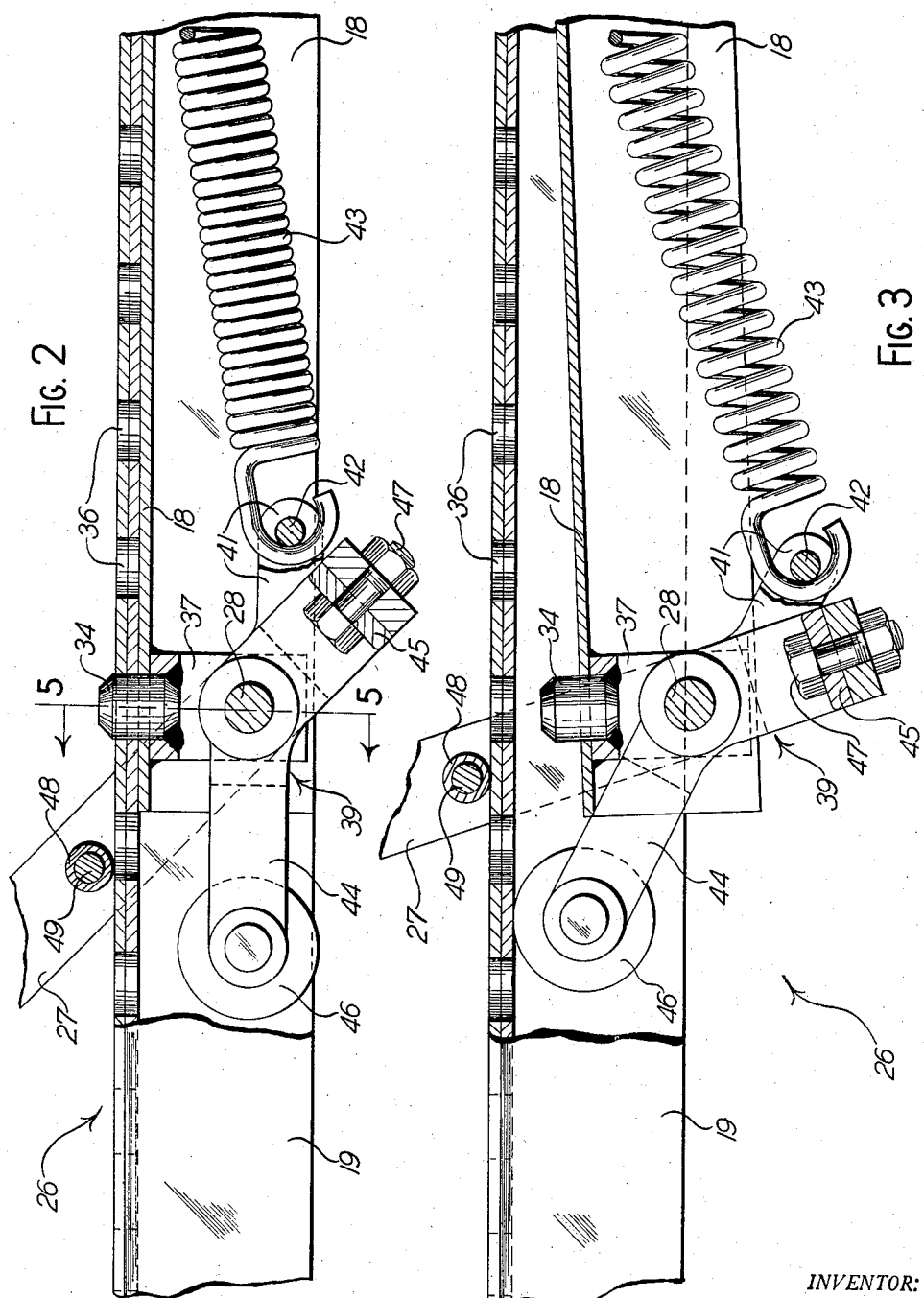

United States Patent Office 2,878,035
Patented Mar. 17, 1959

2,878,035

ADJUSTABLE HITCH FOR TOWING VEHICLES

Wayne A. Downey, East Moline, Ill., assignor to J. I. Case Company, Racine, Wis., a corporation of Wisconsin Application September 14, 1954, Serial No. 455,840

5 Claims. (Cl. 280—482)

This invention relates to towing hitches and it especially relates to an adjustable hitch for towing vehicles such as those employed on a farm.

It is an object of this invention to provide a towing hitch which is readily and easily adjustable in length to thereby permit altering the distance between the towing vehicles and the trailing device.

Another object of this invention is to provide an adjustable towing hitch which can be controlled from a remote point such as the station of the operator on the towing vehicle.

Still another object is to provide an adjustable towing hitch which is self-locking upon commencement of towing.

Another object is to provide an adjustable towing hitch which can be selectively set in a desired exact position.

Other objects and advantages will become apparent upon reading the following description in conjunction with the accompanying drawings, wherein, Fig. 1 is a perspective view of a preferred embodiment of this invention shown attached to fragments of a towing vehicle and a trailing device.

Fig. 2 is an enlarged partially sectioned side elevational view of a part of the embodiment shown in Fig. 1 but with parts thereof in a different position.

Fig. 3 is a view similar to Fig. 2 but with the working parts thereof in substantially the Fig. 1 position.

Fig. 4 is an enlarged sectional view taken on the line 4—4 of Fig. 1.

Fig. 5 is an enlarged sectional view taken on the line 5—5 of Fig. 2.

Similar reference numerals refer to similar parts throughout all of the views.

Fig. 1 shows a perspective view of an embodiment of this invention of an adjustable hitch 10 attached between a tractor 11 and a trailing device 12. The tractor 11 is shown to contain the usual rear wheels 13 and a drawbar 14. The trailer 12 includes a pair of front wheels 16 and a hitch plate 17 conventionally suitably secured to the chassis of the trailer. The hitch 10 is composed of a pair of inverted channel members or drawbars 18 and 19 with the member 18 slightly smaller than the member 19 to permit the two to be telescoped. The front end of the member 18 has a clevis 21 attached thereto and the latter is pivotally connected to the tractor drawbar 14 by a pin or bolt 22 in a conventional manner. Also, the rear end of the member 19 has a connector 23 attached thereto for the purpose of attaching to the hitch plate 17 through a bolt 24 or the like.

With the foregoing described construction, the trailer 12 can be towed by the tractor 11. As hereinafter described, a latch mechanism 26 permits longitudinal adjustment of the members 18 and 19 to vary the distance between the tractor and the trailer.

The adjusting mechanism 26 consists of a connector or lever 27 which is pivotally mounted inside the member 18 on a pin 28, shown in Figs. 2, 3, and 4, while the lever is preferably bifurcated, at its lower end, to always surround the member 19. The upper end of the lever has a rope or cable 32 connected thereto to extend to a point on the tractor and be within the convenient reach of the tractor operator. Further, a U-shaped bracket 33 is welded or otherwise attached, in any well-known manner, to the end of the member 19 to extend across the bottom thereof and prevent the member 18 from falling down from the member 19.

Fig. 2 shows the ends of the members 18 and 19 secured together by a pin 34 which is welded to the top of the member 18 and received in one of a plurality of holes or sockets 36 in the top of the member 19. The pin 34 can be placed in any one of the holes 36 and thereby vary the overall length of the members 18 and 19. A reenforcing plate 38 is preferably spot welded to the top of the member 19 to present holes which are aligned with holes 36 and provide adequate strength for receiving the pin 34. A U-shaped yoke 37 is shown welded to the inside of the channel member 18 and the pin 34 is welded to the yoke to project above the member 18. Also, the pin 28 is secured between the legs of the yoke 37 to be horizontally disposed and to rotatably support a rocker arm and pivot bearing assembly 39. In this manner, the assembly 39 is pivotally secured to the member 18.

The lower end of the assembly 39 has an integral pair of arms 41 which hold a pin 42 therebetween. The latter connects to coil spring 43 which extends therefrom to fasten to the top underside of the member 18, in any well-known manner. Thus, the assembly 39 is spring biased to urge it to pivot counter-clockwise, as seen in Figs. 2 and 3. The upper or opposite end of the assembly 39 has a pair of integral arms 44 which rotatably support a roller 46 for a purpose hereinafter explained.

Figs. 2, 3, and 4 show that the lever 27 is fastened to the lower flanged ends 45 of the assembly 39 by a pair of bolts 47. Thus, actuation of the lever 27 causes the assembly 39 to pivot about the pin 28. The actuation is induced through the rope 32 to move the roller 46 from its position in Fig. 2 to the position in Fig. 3 where the roller 46 engages the top piece of the member 19. Then the assembly 39 acts as a lever to lower the member 18 away from the member 19 and release the pin 34 from the holes 36 in the member 19. Upon release of the rope 32, the spring 43 urges the assembly 39 back to the Fig. 2 position. To accomplish the return movement, the lever 27 is provided with a roller or detent 48 which continually engages the top side of the member 19 and is secured to the lever by a bolt 49. Since the weight of the member 18 is, of course, downwardly, the roller 48 is always in contact with the member 19 and thus provides a fulcrum point on the lever 27.

It should be noticed that Figs. 4 and 5 show a snug fit of the drawbar 18 within the drawbar 19 to prevent respective side movement of the drawbar. Then, in making an adjustment, the drawbars are guided back to their aligned position. Also, the tractor operator can pull the rope 32 to release the pin, as described, and then move the tractor forward or back to the desired connection point and, upon release of the rope, the pin will engage the selected hole.

While this invention has been specifically shown and described, the scope thereof should be limited only by the appended claims.

I claim:

1. A vehicle towing adjustable drawbar comprising a pair of telescopic channel members with the outer one thereof having its open side face down, a pin attached to the upper side of the telescoping end of one of said members, the upper side of the other of said members having a plurality of spaced holes for receiving said pin when said members are aligned, a bearing and rocker arm assembly pivotally attached to the end of the inner one of said members to engage the outer one of said members upon pivotal movement, a lever attached to said assembly to continually support the inner one of said members on the outer one thereof, and a spring attached between said assembly and the inner one of said members to yieldingly urge said members into aligned position by pivoting said assembly and said lever.

2. An extensible vehicle tongue comprising a pair of interengaged downwardly open telescopic channel members, the outer channel member providing a series of openings in the upper web portion thereof, a pin fixed on the upper web of the inner channel and engaging one of the openings in the outer channel, a fulcrum fixed in relation to the inner channel adjacent said pin and one end of said channel within said outer channel, a lever member pivoted on said fulcrum, extending downwardly out of said channel members, across and upwardly beside said channel members, a detent on said lever member engaged with the outer side of the upper web of said outer channel member and swingable about said fulcrum in a direction to press said outer channel downwardly against said inner channel by reason of swinging of said lever member in one direction, a spring engaged between said lever member and said inner channel and stressed to urge said lever member yieldingly in said direction, an arm on said lever member extending beyond the end of said inner channel, means on the arm engaging the underside of the upper web of said outer channel by reason of movement of said lever member in the other direction for forcing said inner channel and said pin downwardly and out of engagement with said opening by reason of movement of said lever member in the other direction and means for rocking said lever member in said other direction, said channel members being relatively slidable in the direction of their length when said pin is disengaged, and said pin being engageable with another of said openings for changing the effective length of said extensible tongue.

3. An extensible vehicle tongue comprising a pair of interengaged telescopic channel members, hitch means on one of said channels attached to a towing vehicle, and hitch means on the other of said channels attached to a trailing vehicle, the outer channel member providing a series of openings in the web portion thereof, a pin fixed on the web of the inner channel and engaging one of the openings in the outer channel, a fulcrum fixed in relation to the inner channel adjacent said pin and one end of said channel within said outer channel, a lever member pivoted on said fulcrum, extending out of said channel members, across the open side and beside the flanges of said channel members, a detent on said lever member engaged with the outer side of the web of said outer channel member and swingable about said fulcrum in a direction to press said outer channel against said inner channel by reason of swinging of said lever member in one direction, a spring engaged between said lever member and said inner channel and stressed to urge said lever member yieldingly in said direction, an arm on said lever member extending beyond the end of said inner channel, means on the arm engaging the web of said outer channel by reason of movement of said lever member in the other direction for forcing said inner channel and said pin out of engagement with said opening by reason of movement of said lever member in the other direction and means for rocking said lever member in said other direction, said channel members being relatively slidable in the direction of their length when said pin is disengaged, and said pin being engageable with another of said openings for changing the effective length of said extensible tongue.

4. An extensible vehicle tongue comprising a pair of interengaged telescopic channel members, the outer channel member providing a series of openings in the web portion thereof, a pin fixed on the web of the inner channel and engaging one of the openings in the outer channel, a fulcrum fixed in relation to the inner channel adjacent said pin and one end of said channel within said outer channel, a lever member pivoted on said fulcrum, extending out of said channel members, across the open side and beside the flanges of said channel members, a detent on said lever member engaged with the outer side of the web of said outer channel member and swingable about said fulcrum in a direction to press said outer channel against said inner channel by reason of swinging of said lever member in one direction, a spring engaged between said lever member and said inner channel and stressed to urge said lever member yieldingly in said direction, an arm on said lever member extending beyond the end of said inner channel, means on the arm engaging the web of said outer channel by reason of movement of said lever member in the other direction for forcing said inner channel and said pin out of engagement with said opening by reason of movement of said lever member in the other direction and means for rocking said lever member in said other direction, said channel members being relatively slidable in the direction of their length when said pin is disengaged and said pin being engageable with another of said openings for changing the effective length of said extensible tongue.

5. An extensible vehicle tongue comprising a pair of substantially rigid juxtaposed elongated members arranged substantially parallel to each other throughout a portion of their lengths, means at one end of one member pivotally and slidably connecting it to the other member intermediate the ends of the latter, pin and socket means between the members interengaged when said members are parallel and disengageable by pivotal movement of one of said members away from the other about said pivotal connecting means, for sliding of said members for adjusting the effective length of the tongue, a lever member pivoted at one end of the other member and extending beside said members, a portion on said lever member in position to be engaged with the first member by reason of swinging of said lever member in one direction, to maintain said other member substantially parallel to the first member with said pin and socket means interengaged, means on said lever member engaged with said first member beyond the end of said other member in position to cause pivotal separation of said members by reason of swinging of said lever member in the other direction, and means engaged with said lever member retaining the same in the first mentioned position.

References Cited in the file of this patent

UNITED STATES PATENTS

| | | |
|---|---|---|
| 316,031 | Haney | Apr. 21, 1885 |
| 649,890 | Crary | May 15, 1900 |
| 849,695 | Nyberg | Apr. 9, 1907 |
| 990,025 | Wilbour | Apr. 18, 1911 |
| 1,066,735 | Kime | July 8, 1913 |
| 1,107,876 | Ballard | Aug. 18, 1914 |
| 1,319,224 | Keesler | Oct. 21, 1919 |
| 1,484,622 | Claus | Feb. 26, 1924 |
| 1,824,821 | Koopmans | Sept. 29, 1931 |
| 2,397,964 | Hiniker | Apr. 9, 1946 |
| 2,531,859 | Mock | Nov. 28, 1950 |

FOREIGN PATENTS

| | | |
|---|---|---|
| 483,313 | Canada | May 20, 1952 |
| 540,702 | Great Britain | Oct. 27, 1941 |